(12) United States Patent
DeVries et al.

(10) Patent No.: US 10,725,176 B2
(45) Date of Patent: Jul. 28, 2020

(54) SYSTEM AND METHOD OF INTRUSION DETECTION

(71) Applicants: Nathan J. DeVries, East Grand Rapids, MI (US); Alysia D. DeVries, East Grand Rapids, MI (US)

(72) Inventors: Nathan J. DeVries, East Grand Rapids, MI (US); Alysia D. DeVries, East Grand Rapids, MI (US)

(*) Notice: Subject to any disclaimer, the term of this patent is extended or adjusted under 35 U.S.C. 154(b) by 0 days.

(21) Appl. No.: 16/353,320

(22) Filed: Mar. 14, 2019

(65) Prior Publication Data

US 2019/0285748 A1    Sep. 19, 2019

Related U.S. Application Data

(60) Provisional application No. 62/642,816, filed on Mar. 14, 2018.

(51) Int. Cl.
| | | |
|---|---|---|
| *G01S 17/04* | (2020.01) | |
| *G08B 21/22* | (2006.01) | |
| *H04W 4/80* | (2018.01) | |
| *H04W 4/029* | (2018.01) | |
| *G06F 21/35* | (2013.01) | |

(52) U.S. Cl.
CPC .............. *G01S 17/04* (2020.01); *G06F 21/35* (2013.01); *G08B 21/22* (2013.01); *H04W 4/029* (2018.02); *H04W 4/80* (2018.02)

(58) Field of Classification Search
CPC ....... G01S 17/04; H04W 4/021; H04W 4/029; H04W 4/80; H04W 12/06; H04W 12/08; H04W 48/04; G06F 21/35; G08B 21/22; H04N 7/181
See application file for complete search history.

(56) References Cited

U.S. PATENT DOCUMENTS

| | | | | |
|---|---|---|---|---|
| 6,697,103 B1 * | 2/2004 | Fernandez | ....... | G08B 13/19608 348/143 |
| 7,830,962 B1 * | 11/2010 | Fernandez | ....... | G08B 13/19608 375/240.16 |
| 8,335,254 B1 * | 12/2012 | Fernandez | ....... | G08B 13/19608 375/240.16 |
| 9,785,879 B1 | 10/2017 | Lauria et al. | | |
| 2001/0010541 A1 * | 8/2001 | Fernandez | ....... | G08B 13/19608 348/143 |
| 2001/0022615 A1 * | 9/2001 | Fernandez | ....... | G08B 13/19608 348/143 |

(Continued)

FOREIGN PATENT DOCUMENTS

EP    3 035 072    6/2016

OTHER PUBLICATIONS

"Multilateration (MLAT)" at wikipedia.org, available as of Dec. 6, 2015, at https://en.wikipedia.org/w/index.php?title=Multilateration &oldid=693939996.

(Continued)

*Primary Examiner* — Orlando Bousono
(74) *Attorney, Agent, or Firm* — Warner Norcross + Judd LLP

(57) ABSTRACT

An intrusion detection system and method are provided. The intrusion detection system may be configured to detect an intruder or authorized person in an area based on light-based feedback and absence of wireless communications with a remote device.

20 Claims, 8 Drawing Sheets

(56) References Cited

U.S. PATENT DOCUMENTS

| | | | |
|---|---|---|---|
| 2001/0029613 A1* | 10/2001 | Fernandez | G08B 13/19608 725/105 |
| 2002/0057340 A1* | 5/2002 | Fernandez | G08B 13/19608 348/143 |
| 2009/0160939 A1* | 6/2009 | Fernandez | G08B 13/19608 348/158 |
| 2012/0075101 A1 | 3/2012 | Austin et al. | |
| 2014/0253437 A1 | 9/2014 | Vaught et al. | |
| 2014/0309864 A1* | 10/2014 | Ricci | B60N 2/0244 701/36 |
| 2014/0368601 A1 | 12/2014 | deCharms | |
| 2015/0163240 A1* | 6/2015 | Geigel | H04L 63/1408 726/23 |
| 2015/0261293 A1 | 9/2015 | Wilairat et al. | |
| 2015/0287296 A1* | 10/2015 | Hall | H04W 88/16 340/541 |
| 2015/0310259 A1 | 10/2015 | Lau et al. | |
| 2016/0025971 A1 | 1/2016 | Crow et al. | |
| 2017/0084146 A1* | 3/2017 | Hall | G08B 13/19697 |

OTHER PUBLICATIONS

"Multilateration" at wikipedia.org, available as of Mar. 12, 2019, at https://en.wikipedia.org/wiki/Multilateration#TDOA_geometry.

* cited by examiner

SYSTEM AND METHOD OF INTRUSION DETECTION

FIELD OF INVENTION

The present application relates to a system and method of intrusion detection, and more particularly toward detecting an intruder within a perimeter area, such as school property.

BACKGROUND

School property is considered a high traffic area in which students and parents often enter and leave on a daily basis. For elementary schools, many parents walk their children to school in the morning and pick them up in the afternoon. Each drop off and pick up involves entry and exit of school property. For secondary schools (e.g., middle school or high school), students often transport to and from school property with little or no assistance from their parents.

Entry to school property conventionally involves two stages of access. The school property may be conceptually separated into two zones: 1) a school building and 2) school grounds on which students or parents, or both, enter to access the school building. For instance, the school grounds may include the land surrounding the school building.

During school hours, access to the school building in many jurisdictions is strictly controlled. Entry into the school building may be limited to a single point of entry, which may be monitored or controlled, or both, by school personnel. Before and after school hours, access to the school building may be less restrictive so that a person can enter or exit, or both, the school building from multiple points (e.g., multiple doors located at different parts of the school building). As a result, an intruder may enter the school building more easily outside school hours, such as just before school hours when students are entering the school building and after school hours when students are leaving the school building.

Access to the school grounds in many school systems is largely permissive so that nearly anyone can enter the school grounds at any time of the day. Other than during recess or lunchtime, the school grounds are largely unmonitored so that an intruder (e.g., a person not authorized for entry on the school grounds) can enter the school grounds unnoticed. During recess or lunch, school personnel may notice the intruder and instruct him or her to leave. But otherwise, in many jurisdictions, an intruder can enter the school grounds passing through this zone without detection.

To counter the possibility of intruder access to the school grounds, some jurisdictions have installed a physical barrier, such as fencing. With this approach, one or more points of entry may be monitored or controlled, or both, so that an intruder can be stopped from entering the school grounds before attempting to enter the school building. Although some success has been achieved with this approach, many jurisdictions have chosen not to install such a physical barrier for a variety of reasons, including for example cost and perception. For instance, installing fencing about a perimeter of a school building can provide the look and feel of a jail rather than an educational environment.

SUMMARY OF THE DESCRIPTION

An intrusion detection system and method are provided. The intrusion detection system may be configured to detect an intruder or authorized person in an area based on light-based feedback and absence of wireless communications with a remote device.

In one embodiment, an intrusion detection system is provided for detecting an unauthorized person within an area. The intrusion detection system may include a light sensor, one or more landmarks, a person recognition module, a light-based location module, and a remote communication system. The light sensor may be configured to sense light reflected from one or more objects in the area, and to generate light sensor output indicative of the light reflected from the one or more objects. The one or more landmarks may be provided in the area, where a position of the one or more landmarks is known and where the one or more objects in the area include the one or more landmarks. Optionally, the one or more landmarks may be absent.

In one embodiment, the person recognition module may be configured to identify a person based on the light sensor output. The light-based location module may be operably coupled to the person recognition module and may be configured to determine person location data pertaining to a location of the person identified by the person recognition module. The light-based location module may be configured to determine the person location data based on known positions of the one or more landmarks provided in the area. In one embodiment, one or more landmarks separate from the light-based sensors may be absent, and the light-based location module may be configured to determine the person location data based on known positions of a plurality of light-based sensors. As an example, the known positions may include pre-defined locations of each of the plurality of light-based sensors. As another example, the known positions may be determined positions (the absolute or relative) based on sensor data from the plurality of light-based sensors. Such sensor data may be light-based or RF-based, e.g., light-based sensor data may be obtained from a plurality of light-based sensors to determine each sensor's position, and/or RF-based data received and/or transmitted by a light-based sensor may form the basis for determining each sensor's position.

The remote communication system may be configured to communicate wirelessly with one or more remote devices in the area, and to determine remote device location data pertaining to a location of the one or more remote devices within the area.

In one embodiment, the intruder determination module may be configured to determine a) the person is an intruder based on the person location data and absence of a remote device being located at or near the location of the person or b) the person is authorized for access to the area based on the location of the person and presence of a remote device located at or near the location of the person.

In one embodiment, a method of detecting an unauthorized person within an area is provided. The method may include sensing light reflected from one or more landmarks and an authorized person, and providing light sensor output based on the light reflected from the one or more landmarks and the authorized person. The method may include generating person location data, based on the light sensor output, pertaining to a location of the authorized person within the area. Wireless communication may be established with a remote device associated with the authorized person, and remote device location data may be generated based on wireless communications with the remote device. The method may include determining the authorized person is not an intruder based on the person location data and the remote device location data being indicative that the remote device is located at or near the location of the authorized person.

In one embodiment, the method may include providing the unauthorized person in the area, and generating person location data, based on the light sensor output, pertaining to a location of the unauthorized person within the area. The method may include determining the unauthorized person is an intruder based on the location of the unauthorized person and absence of a remote device being located at or near the location of the unauthorized person.

These and other advantages and features of the invention will be more fully understood and appreciated by reference to the description of the current embodiments and the drawings.

Before the embodiments of the invention are explained in detail, it is to be understood that the invention is not limited to the details of operation or to the details of construction and the arrangement of the components set forth in the following description or illustrated in the drawings.

The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION

Figure 1:
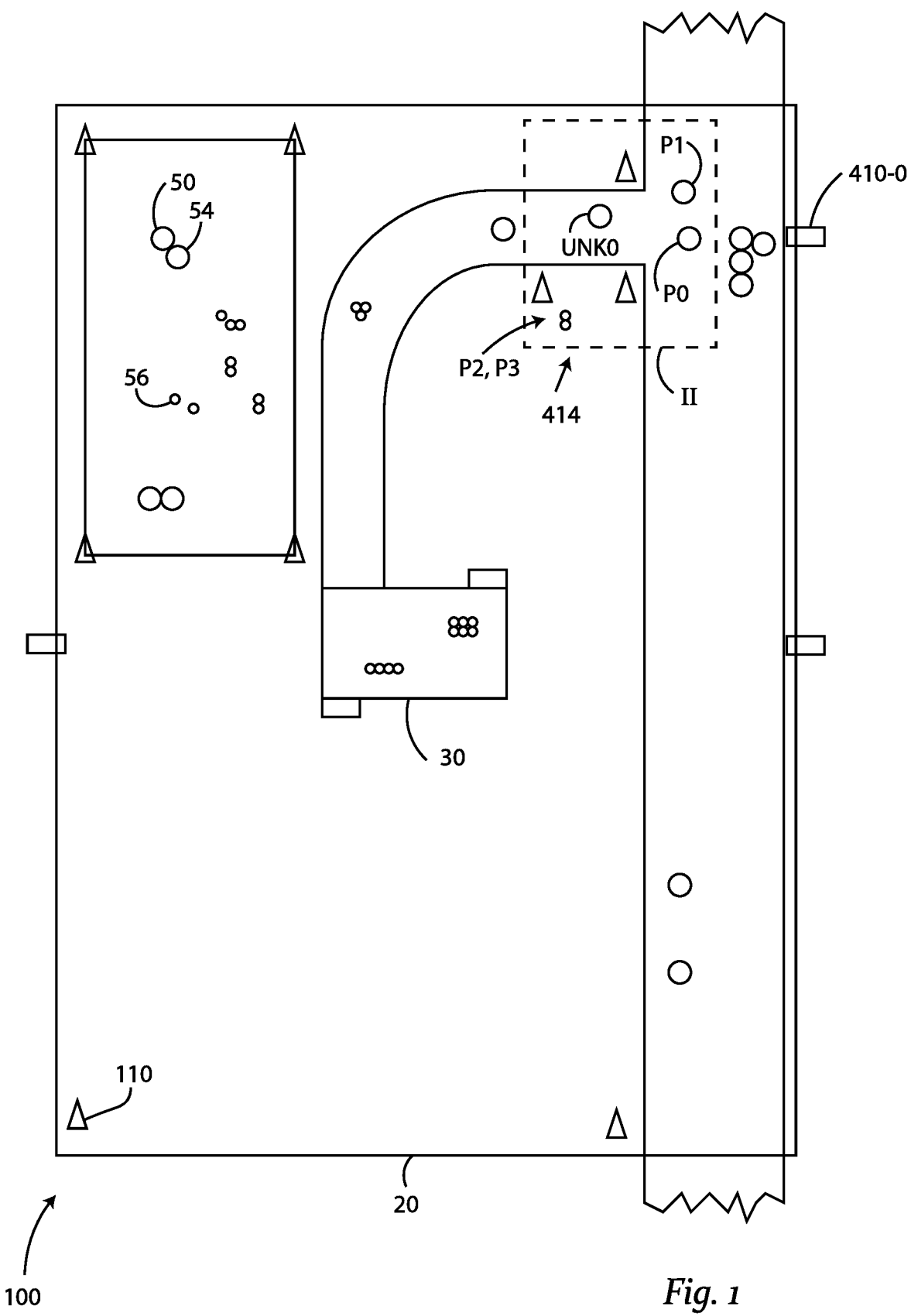
FIG. 1 shows a representative, aerial view of a system in accordance with one embodiment.

An intrusion detection system according to one embodiment is shown in FIG. 1 and generally designated 100. The intruder detection system 100 may be configured to detect an intruder or authorized person in an area based on light-based feedback and absence of wireless communications with a remote device. The intruder may be identified in the area from among a plurality of persons, some of which may be authorized for access to the area. In one embodiment, the area may be substantially unrestricted with respect to physical barriers so that the intruder and authorized persons can freely enter the area but the intruder may be detected in the area.

I. Overview

Figure 3:
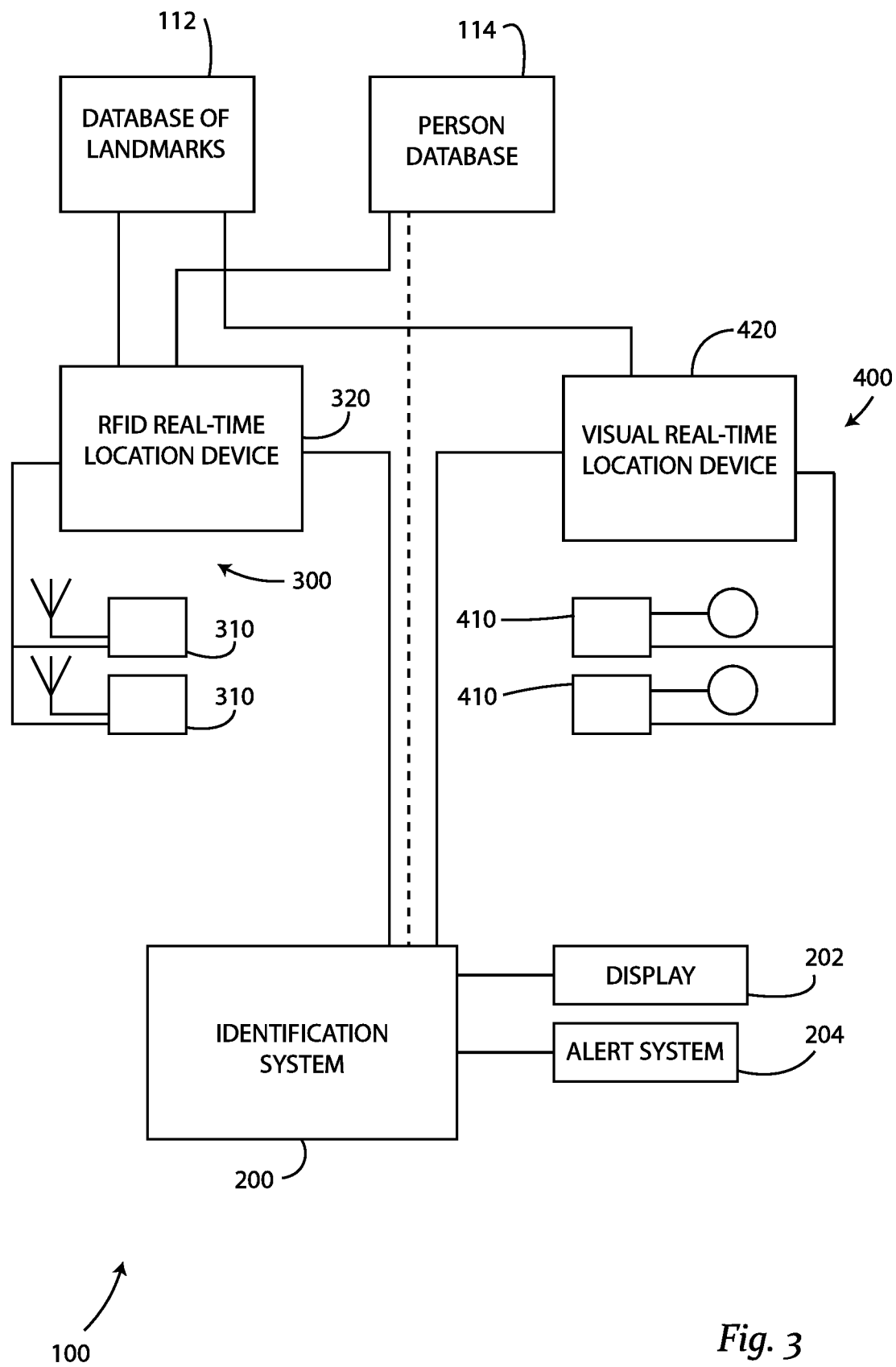
FIG. 3 shows a system in accordance with one embodiment.

In the illustrated embodiment of FIGS. 1 and 3, the intruder detection system 100 may be provided for an area 20 in which one or more persons 50 may enter or exit. The persons 50 are represented as circles in the illustrated embodiment with two different sizes of circles representative of two subclasses of persons: 1) larger circles for adult-size persons 54 and 2) smaller circles for child-size persons 56 (e.g., persons 48" or less in height). The determination of whether a person is adult-sized or child-sized is discussed in further detail herein.

The intruder detection system 100 may be arranged to monitor the area 20 surrounding or adjacent to a building 30. For instance, the building 30 may be a school building and the area 20 may be the school grounds associated with the school building.

The area 20 may include one or more landmarks 110 positioned at various points within the area 20. For purposes of disclosure, the one or more landmarks 110 are depicted in the illustrated embodiment as triangular symbols. In cases where there are a plurality of landmarks 110 in the area 20, the landmarks 110 may be disposed in a uniform manner or non-uniform manner, or a combination thereof with respect to different sections of the area 20. For instance, in the illustrated embodiment, the landmarks 110 are positioned within the area 20 in a non-uniform manner. It should be noted that it is not necessary for the one or more landmarks 110 to be positioned within the area 20. One or more landmarks 110 may be positioned outside the area 20. Alternatively, one or more landmarks 110 may be positioned within the area 20 and one or more landmarks 110 maybe positioned outside the area 20. In alternative embodiment, the one or more landmarks 110 may be absent.

The landmarks 110 may be pre-existing or installed to operate with the intruder detection system 100. The landmarks 110 may not all be the same in one embodiment, and may vary depending on the area 20.

Examples of the landmarks 110 include objects considered pre-existing and permanent, such as trees, fence posts, support posts, and parking lot objects (e.g., curbs, driveways, and painted lines). As another example, the area 20 may be provided with one or more landmarks 110 that are positioned to be permanent and to operate with the intruder detection system 100—e.g., a surface mark may be painted on a parking lot surface or a sidewalk surface, or both, or a post may be partially buried in the ground with a portion of the post extending vertically from the ground to provide a visible landmark, or any combination thereof.

The one or more landmarks 110 may have similar or different heights. One landmark 110 may have the same or substantially similar height to another landmark 110 but a different height from yet another landmark 110.

The one or more landmarks 110 may be constructed to reflect light. The reflectance of a landmark 110 may be its inherent reflectance. For example, one or more inherent attributes of the landmark (such as its color) may reflect light in the visual spectrum or the infrared spectrum, or both. Additionally or alternatively, the landmark 110 may be provided with a reflector that potentially increases reflectance for a region of the landmark 110 relative to other regions of the landmark 110. Examples of such a reflector are a prismatic reflector or reflective tape. As described herein, the reflector may be disposed on the landmark 110 so that it faces one or more light sensors (e.g., a camera or a laser-light sensor of a LiDAR system).

The source of light reflected from one or more of the landmarks 110 may be environmental (such as from the Sun) or artificially generated by an electrically powered light source. The source of light may output one or more light spectrums of light, such as ultraviolet spectrum light, infrared spectrum light, or visual spectrum light, or any combination thereof. The source of light may be broad or narrow spectrum. In one instance, the source of light may generate light that is coherent, spatially and temporally, allowing transmission of light toward a particular spot and with a narrow spectrum.

It should be noted that the area 20 may correspond to terrain that is at least partially undeveloped or at least partially covered in vegetation, or a combination thereof. As a result, the topography of the area 20 is unlikely to be uniform—although the intruder detection system 100 may be utilized in conjunction with a uniformly level area 20. Elevations of one part of the area 20 may be different from elevations at another area 20. In one embodiment, such elevation changes or the topography of the area 20 may be surveyed for use in conjunction with the intruder detection system 100. For instance, the elevation of a particular part of the area 20 may be stored in memory and used as a basis for determining a reference frame for identifying a person or one or more attributes of a person, or a combination thereof.

In the illustrated embodiment of FIG. 3, the intruder detection system 100 may include one or more of the following: an RFID real-time location system 300, a light-based real-time location system 400, and an identification system 200. One or more of these components of the intruder detection system 100 may be communicatively coupled to a) a database of the landmarks also described as a landmark database 112 or b) a person database 114, or a combination thereof.

In the illustrated embodiment, the light-based real-time location system 400 may include one or more light sensors 410 configured to sense a characteristic of light to generate light sensor output. Examples of the light sensor 410 include a camera or a laser-light sensor of a LiDAR system. The RFID real-time location system 300 may include one or more wireless sensors (e.g., an antenna 310 or an antenna array) configured to communicate wirelessly with one or more RFID devices. The light-based real-time location system 400 may generate light-based location information with respect to one or more persons in the area 20 and one or more of the landmarks 110, and the RFID real-time location system 300 may generate communication-based location information with respect to one or more RFID devices in the area 20.

The locations of each of the landmarks 110 may be known or determined based on one or more sensed characteristics. Optionally, the elevation of each landmark 110 may be known or determined based on one or more sensed characteristics. Elevation information for each landmark 110 may be stored in memory and accessible to one or more components of the intruder detection system 100. The elevation information for each landmark 110 may include ground elevation at the location of the landmark 110 or the absolute elevation of the landmark 110 above the ground, or a relative height of the landmark 110 with respect to the ground, or a combination thereof. The locations of each landmark 110 may be stored as Cartesian coordinates (e.g., X, Y coordinates) relative to an origin point defined relative to the area 20. Although the ground area is curved, the curvature may be considered to be de minimus depending on the size of the area 20, and so Cartesian coordinates may be sufficient for location purposes. Alternatively, the locations of each landmark may be determined as latitude and longitude coordinates or translatable between Cartesian coordinates and latitude and longitude coordinates. Use of latitude and longitude coordinates may facilitate location calculations that utilize coordinates obtained from a global positioning system (GPS), such as location calculations for a remote device or a person, or both.

The location information with respect to each of the landmarks 110 may be used as a basis for determining a reference frame with respect to one or more light sensors. The height, the elevation, or the location, or any combination thereof, of the light sensor may be known or determined. A relative angle of the light sensor to one or more landmarks 110 may be determined as part of the reference frame based on the location information and at least one of the height, the elevation, and the location of the light sensor.

Determination of the reference frame is not limited to use of one or more landmarks 110. Landmarks 110 may or may not be used in conjunction with other determination techniques. For instance, the reference frame may be determined based on locations of each light sensor, such that a field of view of the light sensor (and objects within the field of view) can be translated to the reference frame. The locations of each light sensor may be pre-determined at installation, or determined dynamically based on sensor data obtained from each light sensor or sensor data obtained with respect to a device co-located with each light sensor, such as a wireless communication device (e.g., an RFID device). For instance, the field of view of a plurality of light sensors may be correlated with each other to determine a reference frame and relative locations of each light sensor within the reference frame. As another example, additionally or alternatively, the reference frame for a light sensor may be determined based on RF communications with a wireless communication device disposed on or proximal to the light sensor.

Based on the reference frame determined with respect to the light sensor 410 and one or more landmarks 110, output from the light sensor 410 for another object, such as a person, may be processed to determine a location of the object within the area 20. As an example, light sensor output may be an image that can be processed with an edge detection filter to identify a location of the object in the image. The image may include the one or more landmarks 110 to facilitate providing a reference frame for the object in the image with respect to the area 20, thereby enabling the location of the object in the image to be translated to a location in the area 20. Alternatively, the field of view of the light sensor 410 may be correlated to a reference frame without use of landmarks 110, such that the location of the object in the image can be determined based on a translation of the sensor output from the light sensor 410. In one embodiment, the light sensor 410 may be a LiDAR system capable of providing a point field map of the area surrounding the light sensor 410. The location of the object may be determined based on this point field map.

In one embodiment, the height of the object relative to the ground may be determined based on the light sensor output and the location information obtained with respect to the one or more landmarks 110 and/or the reference frame. This height information may form at least part of the basis for determining the object is a child-sized person or an adult-sized person.

In one embodiment, the object sensed by the light sensor 410 may correspond to a group of persons. The number of individuals in the group may be determined in a variety of ways, including edge detection and the overall size of the group corresponding to a likely number of individuals.

As discussed herein, the intruder detection system 100 may include an RFID real-time location system 300 that is configured to communicate with an RFID device and determine a location of the RFID device within the area 20. Based on the determined location of the RFID device, the intruder detection system 100 may identify whether an object identified by the light sensor 410 is an intruder or authorized for access to the area 20.

Location information generated from the light-based real-time location system 400 and the RFID real-time location system 300 may be provided to an identification system 200. The identification system 200 may identify correspondence or lack of correspondence with the location information obtained from the light-based real-time location system 400 and the RFID real-time location system 300 and identify one or more authorized persons for access to the area 20 or one or more intruders with no authorized access to the area 20. In one embodiment, an intruder can be identified merely by being present in the area 20 with no other communication capabilities with respect to the intruder detection system 100.

The intruder detection system 100 may provide a virtual fence for the area 20 that persons can enter freely but are identified as intruders or authorized persons based on one or more criteria. For instance, if the system determines the person is a child, the person may be considered authorized. Additionally, or alternatively, the intruder detection system 100 may identify the person as authorized if the person is carrying an RFID device and correspondence exists between a) location information for the RFID device based on the RFID real-time location system 300 and b) location information for the person based on the light sensor output. The location information may include position or location within the area 20 or a motion vector with respect to the area 20, or both.

In response to detection of an intruder entering the area 20, the identification system 200 may generate a notification, such as an audible alert or a communication to another system 204. Examples of communication to another system 204 include transmitting a text message to a school administrator about the location of the intruder and an image thereof, or updating a display 202 of the area 20 to visually identify the intruder (e.g., a symbol overlaying the intruder).

II. RFID Real-Time Location System

Figure 4:
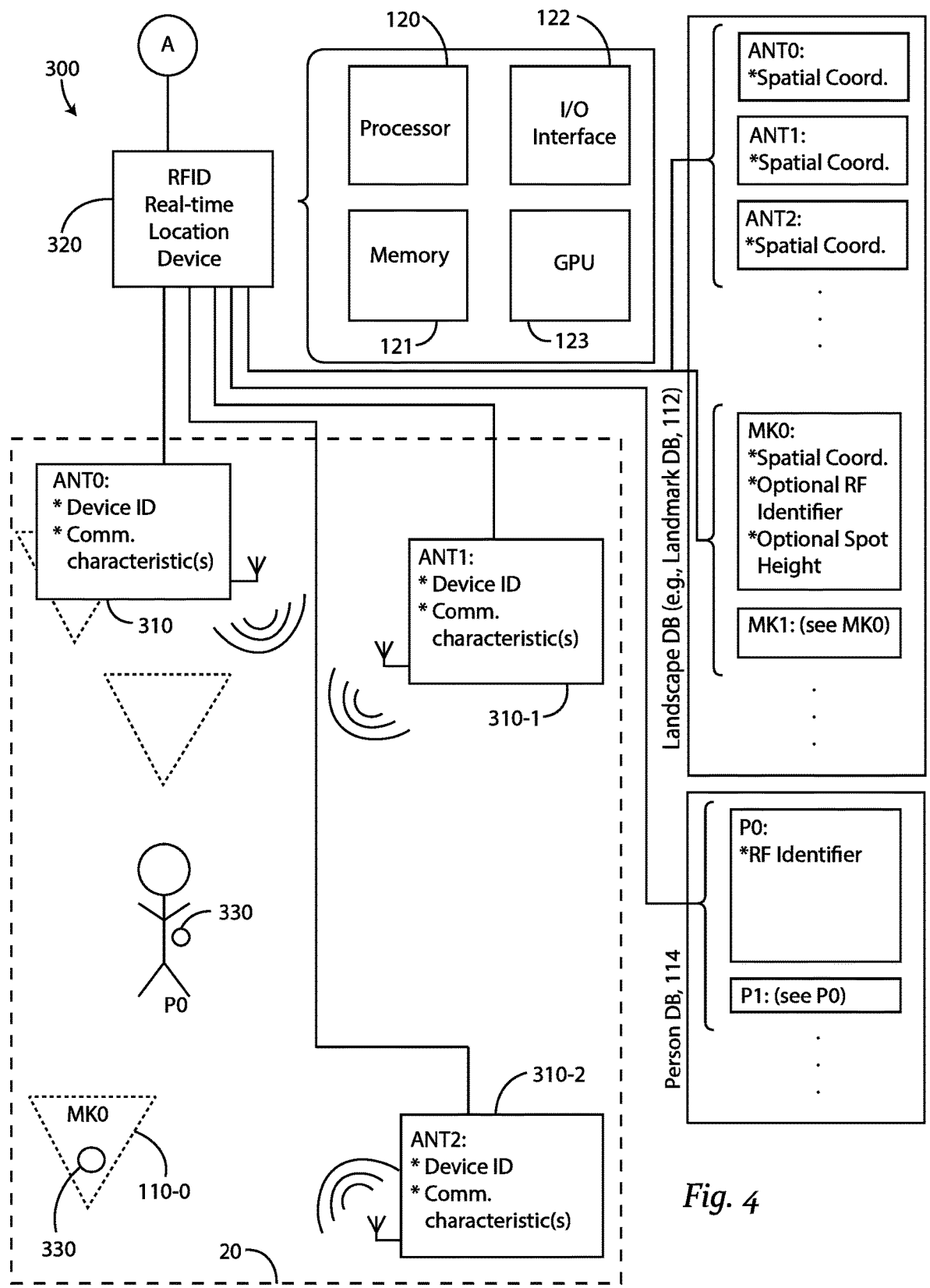
FIG. 4 shows an RF real-time location system in accordance with one embodiment.

An RF real-time location system (RFRLS) 300 in accordance with one embodiment is shown in FIG. 4. The RFRLS 300 may include a real-time location device 320 and a plurality of antennas 310. In the illustrated embodiment, the real-time location device 320 is coupled to the plurality of antennas 310 and capable of obtaining information pertaining to a sensed characteristic of a signal received by or transmitted from, or both, the antenna 310. For instance, the real-time location device 320 may determine a signal strength of a signal received by the antenna 310 from an RFID device.

Although described in conjunction with an RFRLS 300 and a RFID real-time location device 320, the present disclosure is not limited to RFID configurations and protocols. The real-time location system may be implemented in conjunction with any type of wireless communication system, including RF communications, and with any type of device capable of wireless communications. One example of RF communication systems that may be utilized in conjunction with RF-based real-time location determinations includes Wi-Fi communication configurations and protocols. It should also be understood that the RFRLS 300 may include a plurality of real-time location devices 320, each coupled to one or more respective antennas 310.

The real-time location device 320 in the illustrated embodiment may include one or more of the following: a processor 120, memory 121, and an input/output interface 122. The processor 120 may be a central processing unit (CPU), such as an Intel Core i7 Processor, with a plurality of cores (physical or logical, or a combination thereof) configured to process a plurality of threads or processes simultaneously. Memory 121 may be shared on an integrated circuit associated with the processor 120, or may be separate from the integrated circuit associated with the processor 120 and in communication with the processor 120 via the input/output interface 122, or a combination thereof.

In one embodiment, all or a portion of the real-time location device 320, such as modules of the device, that are executed on the processor 120, memory 121, and input/output interface 122 may instead be implemented in hardware, such as in an FPGA. As an example, comparison or analysis of a signal characteristic of a signal received by one or more of the antennas 310 may be conducted in hardware.

Optionally, the real-time location device 320 may include a graphics processing unit (GPU) 123 with many more cores than the processor 120 (e.g., hundreds or thousands more) to enable parallel processing of training parameters for one or more models initialized and trained in accordance with a machine learning algorithm. In this way, the GPU 123 may simultaneously process significantly more threads or processes than the processor 120 in training a machine learning algorithm to determine spatial coordinates about objects or communications sensed by one or more antennas 310. Use of the GPU 123 in this manner may significantly decrease the amount of training time associated with generating the one or more models. Alternatively, the GPU 123 may be used to execute the machine learning algorithm, which may or may not be trained by the real-time location device 320. In one instance, the number of layers and weights associated with the machine learning algorithm may be executed in parallel on the GPU 123 much faster than would otherwise be possible with a more general configuration for the processor 120.

Additionally, or alternatively, the RFRLS 300 may include a plurality of real-time location devices 320. One or more of the plurality of real-time location devices 320 may be coupled to one of the antennas 310 to form an antenna device. The real-time location devices 320 may not all be configured the same—for instance, a real-time location device 320 incorporated into an antenna device may include a different set of functionality than a real-time location device 320 that is separate from an antenna 310 but capable of receiving a sensed characteristic of a signal received by the antenna 310. The real-time location device 320 that is separate from the antenna 310 in this embodiment may communicate with a real-time location device 320 incorporated into the antenna device with the antenna 310. This communication may allow the separate real-time location device 320 to obtain information pertaining to the sensed characteristic of the signal received by the antenna 310. The separate real-time location device 320 may communicate with more than one antenna device to obtain a sensed characteristic of a signal received by a plurality of antennas 310.

In the illustrated embodiment, the real-time location device 320 may be operably coupled to a plurality of antennas 310-0, 310-1, 310-2 disposed in or near the area 20. The locations of the antennas 310-0, 310-1, 310-2 may be stored in the landmark database 112, optionally in memory 121. The landmark database 112, as discussed herein, may be stored in memory 121 of the real-time location device 320 or in memory of another device communicatively coupled to the real-time location device 320, or a combination thereof. The landmark database 112 may store a variety of information with respect to each of the antennas 310-0, 310-1, 310-2, including location information. The location information stored for an antenna 310 in the landmark database 112 may include spatial coordinates of the antenna 310 relative to the area 20 or in absolute terms of latitude and longitude. The location information for the antenna 310 may also include a height of the antenna relative to the ground or an elevation of the antenna 310, or a combination thereof. The information stored in the landmark database 112 may also include configuration information with respect to the antenna 310, including for instance, a beam configuration of the antenna 310.

The information stored in the landmark database 112 may be dynamic such that spatial information or location information about the antennas 310 and/or the landmarks 110 is determined based on sensor output obtained or analysis of such sensor output from at least one of the RFRLS 300 and/or the LRLS 400 (described herein). As an example, a tree identified in the field of view of a light sensor 410 (e.g., an image or point field map) of the LRLS 400 may be correlated with the same tree in the field of view of a light sensor 410 (e.g., an image or point field map) of the LRLS 400. The position of the tree in both fields of view may be identified as a landmark 110 and stored in the landmark database 112. Additionally, the position of the tree in conjunction with dynamically identified landmarks 110 (or predetermined landmarks 110) may facilitate identifying relative positions of components of the RFRLS 300 and/or the LRLS 400. For instance, if an antenna 320 of a real-time location device 320 is disposed proximal to or in the same position as a light sensor 410 of the LRLS 400, and the tree as well as light sensors 410 may be located relatively to each other and therefore the antenna 320 may be located as well. This location information about components of the RFRLS 300 and/or the LRLS 400 may be determined dynamically or during a calibration mode and stored in the landmark database 112.

The real-time location device 320 may communicate with an RFID device 330 via one or more of the antennas 310-0, 310-1, 310-2 and determine a location of the RFID device 330 based on a signal characteristic (or signal characteristics) of communications with the RFID device 330. In one embodiment, the RFID real-time location device 320 may transmit an RF interrogating signal, and the RFID device 330, which senses or is receptive to the interrogating RF signal, may respond by transmitting a return RF signal. Each RFID 330 device may either generate the return RF signal originally, or reflect back a portion of the interrogating RF signal in a process known as backscatter. The return RF signal may further encode data stored internally in the RFID device 330. The return signal may be demodulated and decoded into identification data (also known as the payload) by the real-time location device 320, which thereby identifies, counts, or otherwise interacts with the RFID device 330. The decoded data can denote a serial number, a date, a destination, a location, other attribute(s), or any combination of attributes, and so on. The RFID device 330 may be any type of device capable of receiving and transmitting wireless communications.

The real-time location device 320 may determine the specific location of the RFID device 330 in the area 20 by processing one or more signal characteristics with respect to the plurality of antennas 310-0, 310-1, 310-2 using at least one of multi-angulation (e.g., triangulation) and multi-lateration (e.g., trilateration), Doppler effects, and machine learning algorithms. Multi-lateration may be based on time of flight or received signal strength, and Multi-angulation may be based on angle of arrival, which itself can be determined in a variety of ways, including phase differences or Doppler effects, or any combination thereof. Additionally, or alternatively, the real-time location device 320 may determine a motion vector with respect to the RFID device 330 in the area 20. This motion vector may facilitate tracking of the RFID device 330 over time and may be used in conjunction with the light-based real-time location system 400 to enhance location accuracy.

In the illustrated embodiment, a person entering the area 20 may carry the RFID device 330, which includes an identifier (e.g., a serial number) stored in the person database 114 and associated with the person. Authorization information associated with the person may also be stored in the person database 114. This authorization information may be obtained by the identification system 200 to determine whether the RFID device 330 carried by the person is authorized for access to the area 20.

The real-time location device 320 may determine location information with respect to the RFID device 330 carried by the person, and communicate this location information to the identification system 200. As discussed herein, the location information may include spatial coordinates or a motion vector, or a combination thereof. The location information may be output from the RFID real-time location device as data A, also described as RF-based location information.

In one embodiment, an RFID device 330 may be disposed on one or more of the landmarks 110 in the area 20. The one or more landmarks 110 in this embodiment may serve as both a light-based landmark and an RF landmark—however, the present disclosure is not so limited. A landmark 110 may serve as only one type of landmark 110, such as only a light-based landmark or only an RF landmark. In the illustrated embodiment of FIG. 4, the landmark 110-0 includes an RFID device 330 configured to communicate with the plurality of antennas 310-0, 310-1, 310-2. Such communications may facilitate calibration with respect to the one or more signal characteristics sensed by the antennas 310-0, 310-1, 310-2, thereby enhancing the accuracy of determining location information with respect to an RFID device 330 carried by a person in the area 20. The landmark database 112 may include information relating to a location of the RFID device 330 associated with the landmark 110-0, such as the spatial coordinates of the RFID device 330 (including a position of the RFID device 330 within or in proximity to the area 20 and optionally including a height or elevation of the RFID device 330).

Figure 7:
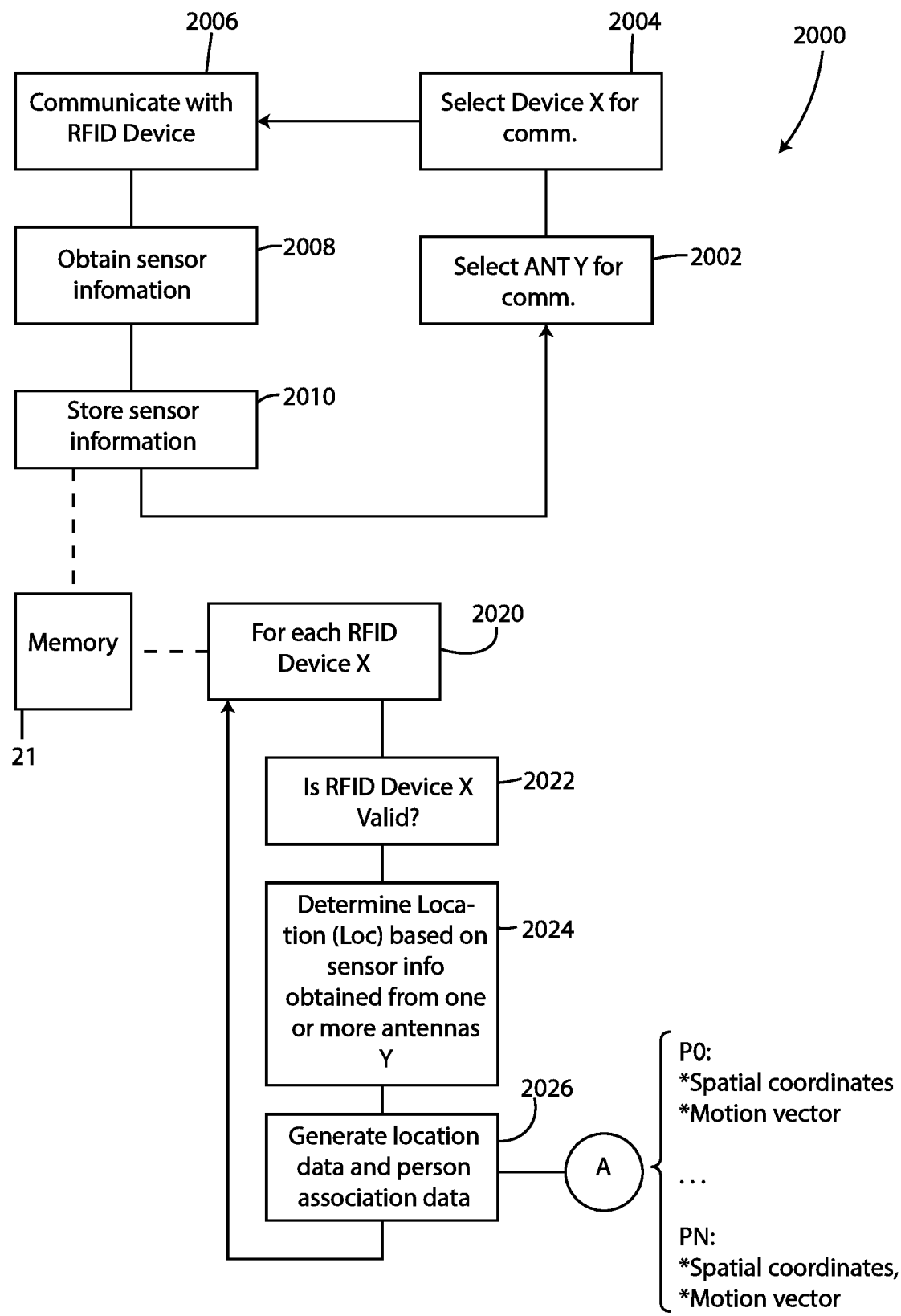
FIG. 7 shows a method of operation in accordance with one embodiment.

A method of determining a location of one or more RFID devices 330 in accordance with one embodiment is depicted in FIG. 7 and generally designated 2000. The method 2000 may include transmitting an interrogation signal from an antenna 310 and selecting an RFID device 330 to communicate with based on the response to the interrogation signal. Steps 2002, 2004, 2006. Multiple RFID devices 330 may respond to the interrogation signal, and the antenna 310 may communicate with each of the responding RFID devices 330 in turn based on one or more criteria, such as starting with the RFID device 330 with the strongest response signal and ending with the RFID device 330 with the weakest signal or a signal strength above a cutoff level. The antenna 310 may obtain sensor information with respect to communications with the RFID device 330—e.g., the antenna 310 may sense one or more signal characteristics of communications with the RFID device 330, such as signal strength, angle of arrival, time of flight, and time of arrival. Step 2010. The real-time location device 320 may synchronize operation of multiple antennas 310 so that a signal characteristic of communications with the RFID device 330, such as a time difference of arrival, may be sensed in multiple antennas 310 disposed at different locations.

The sensor information obtained with respect to communications with the RFID device 330 may be stored in memory 21. Step 2010. The method 2000 may communicate with the RFID device 330 with another antenna 310 to determine one or more sensed characteristics of the communications. Step 2002. Additionally or alternatively, the one or more sensed characteristics of communications with respect to a plurality of the antennas 310 may be determined substantially with respect to the same communications between the RFID device 330 and one or more of the antennas 310.

Based on the sensor information stored in memory 21 in connection with each RFID device 330 sensed by the real-time location device 320, the method 2000 in one embodiment may determine location information for each of the RFID devices 330. The communications with the RFID device 330 may include obtaining an identification code pertaining to an identity of the RFID device 330. Steps 2020, 2022. If the identification code is consistent with a valid or known RFID device 330 stored in the person database 114, the location of the RFID device 330 may be determined based on the sensor information. Step 2024. Examples of location information include spatial coordinates of the RFID device 330 in the area 20 and/or a motion vector of the RFID device 330. For instance, the speed of motion of the RFID device 330 and the direction of travel of the RFID device 330 (e.g., a velocity vector) may be determined based on the sensor information obtained with respect to a plurality of the antennas 310. The location information may be communicated as data A in accordance with one or more embodiments described herein. Step 2026. The location information may be determined for each valid RFID device 330 that responds to one or more interrogation signals emanating from one or more of the antennas 310.

III. Light-Based Real-Time Location System

Figure 5:
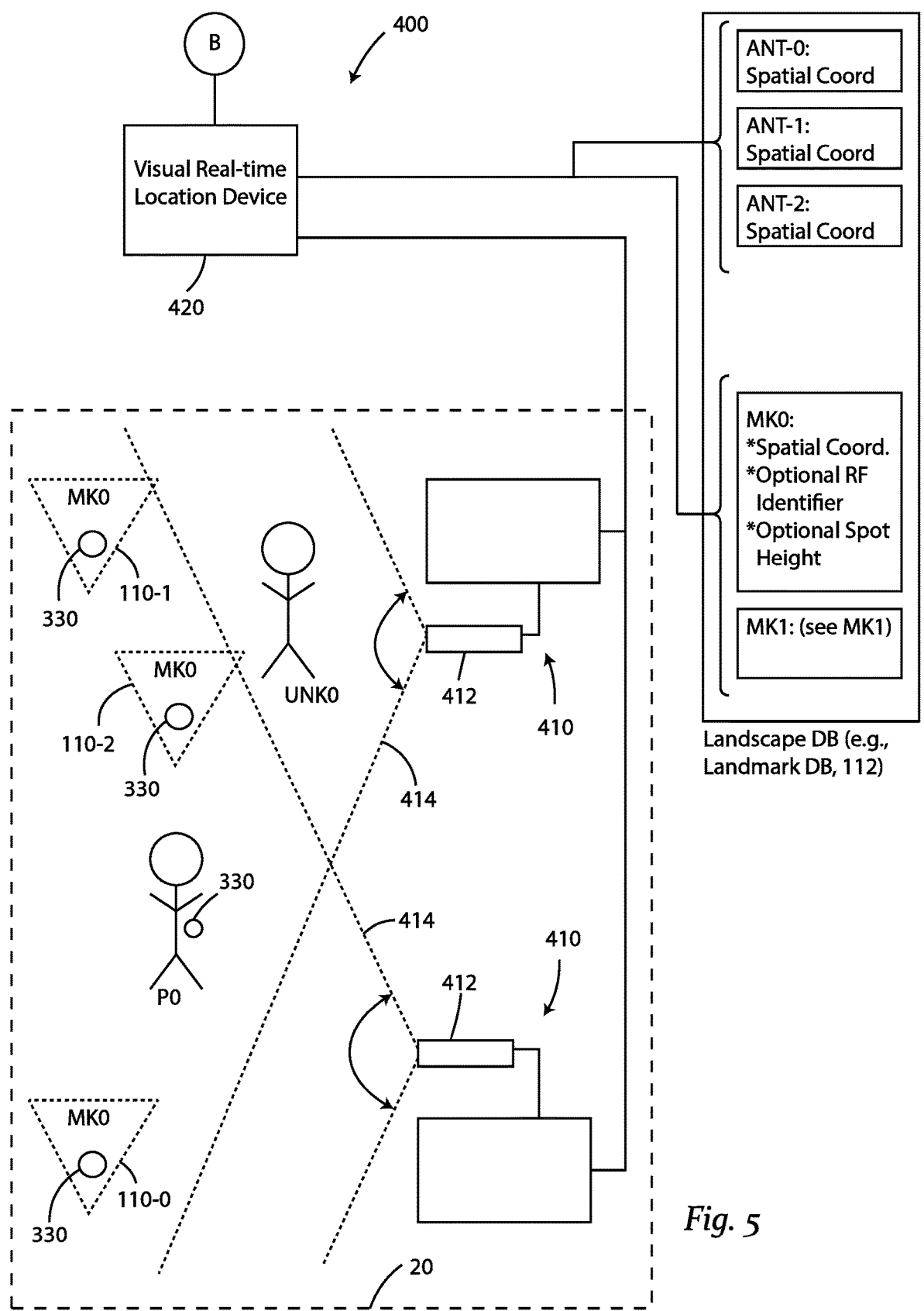
FIG. 5 shows a light-based real-time location system in accordance with one embodiment.

A light-based real-time location system (LRLS) 400 in accordance with one embodiment is shown in FIG. 5. The LRLS 400 may include a visual real-time location device 420 and a plurality of light sensors 410.

For purposes of disclosure, the LRLS 400, the visual real-time location device 420 and the plurality of light sensors 410 are described in conjunction with sensing light in the visual spectrum to identity locations of objects. The present disclosure is not so limited—the LRLS 400 may be configured to operate with any electromagnetic spectrum, including infrared, or a combination thereof. The light sensor 410 may be configured to sense electromagnetic waves or particles (e.g., visual spectrum light) reflected from an object and its surrounding environment. The source of the electromagnetic waves reflected from the object may be environmental, such as from the Sun, or artificially generated by the LRLS 400. Examples of artificially generated sources include an Infrared LED source, or a scanning laser used in a LiDAR system.

In one embodiment, the LRLS 400 may be replaced or supplemented with an RF based system for determining locations of physical objects based on reflected electromagnetic waves. For instance, a microwave radar and/or Doppler microwave detection system may be provided that facilitates determining locations of objects in the field of view.

The artificially generated source may control emission of waves or particles such that one or more characteristics of the waves or particles may be varied over time. For instance, the artificial source may control the polarization or phase angle of the waves being generated. In one instance, multiple artificial sources may be emitting waves having different characteristics, such as different polarization angles. The artificial source in one embodiment may change its output to emit waves having different characteristics. The light sensor 410 may be configured to detect differences, in the electromagnetic waves or particles reflected from the object, that correspond to the different characteristics of the electromagnetic waves or particles emitted from one or more artificial sources. Based on these differences and a characteristic sensed with respect to the electromagnetic waves or particles, the LRLS 400 may determine location information pertaining to the object.

The light sensor 410 may include a detector 412 capable of sensing light reflected from within the area 20. The reflected light sensed by the detector 412 may be reflected from objects in the field of view 414 of the detector 412. The field of view 414 of the detector 412 may not include the entirety of the area 20, and may instead focus on a sub-zone of the area 20. In the illustrated embodiment, the detector 412 is a CCD camera capable of detecting reflected light at least in the visual spectrum, and generating a visual image corresponding to the field of view 414.

The light sensor 410 may be configured similarly in some respects to the real-time location device described in connection with the illustrated embodiment of FIG. 4, such as including at least one of a processor 120, memory 121, and an input/output interface 122. The light sensor 410 may be communicatively coupled to the visual real-time location device 420 to provide the light sensor output from the detector 412 to the visual real-time location device 420 or sensed information based on the light sensor output, or a combination thereof. Such communication may be wired or wireless.

In one embodiment, the light sensor 410 may include an artificial source configured according to one or more embodiments described herein with respect to the artificial source.

The field of view 414 of the light sensor 410 may include one or more of the landmarks 110, designated 110-0, 110-1, 110-2 in the illustrated embodiment of FIG. 5. As described herein, the light reflected from the one or more landmarks 110-0, 110-1, 110-2 may facilitate identifying a reference frame for the field of view 414 of the light sensor 410, including spatial locations for the one or more landmarks 110-0, 110-1, 110-2 within the field of view 414 and a detection angle of the light sensor 410 relative to horizontal or the ground.

The detector 412 of the light sensor 410 may be mounted at a height relative to the ground to provide the detector 412 with a vantage point sufficient to substantially avoid objects from obstructing each other with respect to reflected light in a focus area within the field of view 414. The detector 412 may be aimed toward the focus area looking generally downward toward the focus area within the field of view 414. The angle of the detector 412 relative to horizontal or the ground may be pre-determined at installation or may be determined based on the spatial locations for the one or more landmarks 110-0, 110-1, 110-2 within the field of view 414. For instance, with three landmarks 110-0, 110-1, 110-2 within the field of view 414, based on the a) known or determined spatial coordinates of these three landmarks 110-0, 110-1, 110-2 within the field of view 414 and b) the pixel locations of the landmarks 110-0, 110-1, 110-2 within the field of view 414 in the image sensed by the detector 412, the scale of the image and its reference frame (including the angle of detection) may be determined.

In one embodiment, at least three points of detection, corresponding to the landmarks 110-0, 110-1, 110-2 with the field of view 414, may define a plane relative to the pixels of the image. The plane may enable the pixels of the image to be translated to actual locations of the area 20, providing a reference frame for pixels of the image.

In the illustrated embodiment of FIG. 5, the detector 412 may obtain an image of the field of view 414. The image may be based on any type of light reflected from an object, as described herein; but for purposes of the disclosure the image is described as being based on reflected light in the visual spectrum. The image may be processed by an edge detection module (not shown) that may be incorporated into the LRLS 400 or the light sensor 410, or a combination thereof. For instance, the edge detection module may be stored in memory 121 and executed by the processor 120.

The edge detection module may be configured to receive the image output from the detector 412 and generate an edge-based image corresponding to an outline of objects of potential interest. One example of an edge detection processing technique includes searching for zero crossings from a function derived from one or more characteristics of the image (e.g., values corresponding to a color channel of each pixel of the image or an intensity of the pixel, or a combination thereof). Another example of this technique is the Canny edge detector, or variants thereof.

In one embodiment, the edge detection module may process images obtained from different detectors 412 at different positions having different fields of view 414 that overlap with respect to a portion of the area 20. An example of such an overlap is depicted in the illustrated embodiment of FIG. 5. Based on the different fields of view 414 and the known, different locations of the detectors 412, stereoscopic edge detection may be achieved. Depth information may be obtained by the images having overlapping fields of view 414 of the area 20, and this depth information may form the basis for identification of an object and its edges with respect to the images obtained from the different detectors 412. This multi-field technique for identifying edges with respect to objects in the area 20 may be conducted with two or more detectors 412 spaced apart from each other.

The edge detection module may be communicatively coupled to the landmark database 112, which may include identifying information about the edge outline or image characteristics, or both, of each landmark 110. The edge detection module may search for a group of pixels within the image that satisfy one or more criteria based on the identifying information. This way, the LRLS 400 can identify a group of pixels in the field of view 414 for each detector 412 that correspond to a landmark 110.

Although described in conjunction with an edge detection module for identifying outlines of objects of interest in the field of view 414, it should be understood that the present disclosure is not so limited. The LRLS 400 may not include an edge detection module or use an edge detection module for other purposes, such as for providing an outline around an object of interest (e.g., an intruder) on a display. In one embodiment, the LRLS 400 may identify a group of pixels in the image as corresponding to a landmark 110 substantially without edge detection techniques and based on the identifying information obtained from the landmark database 112.

Figure 2:
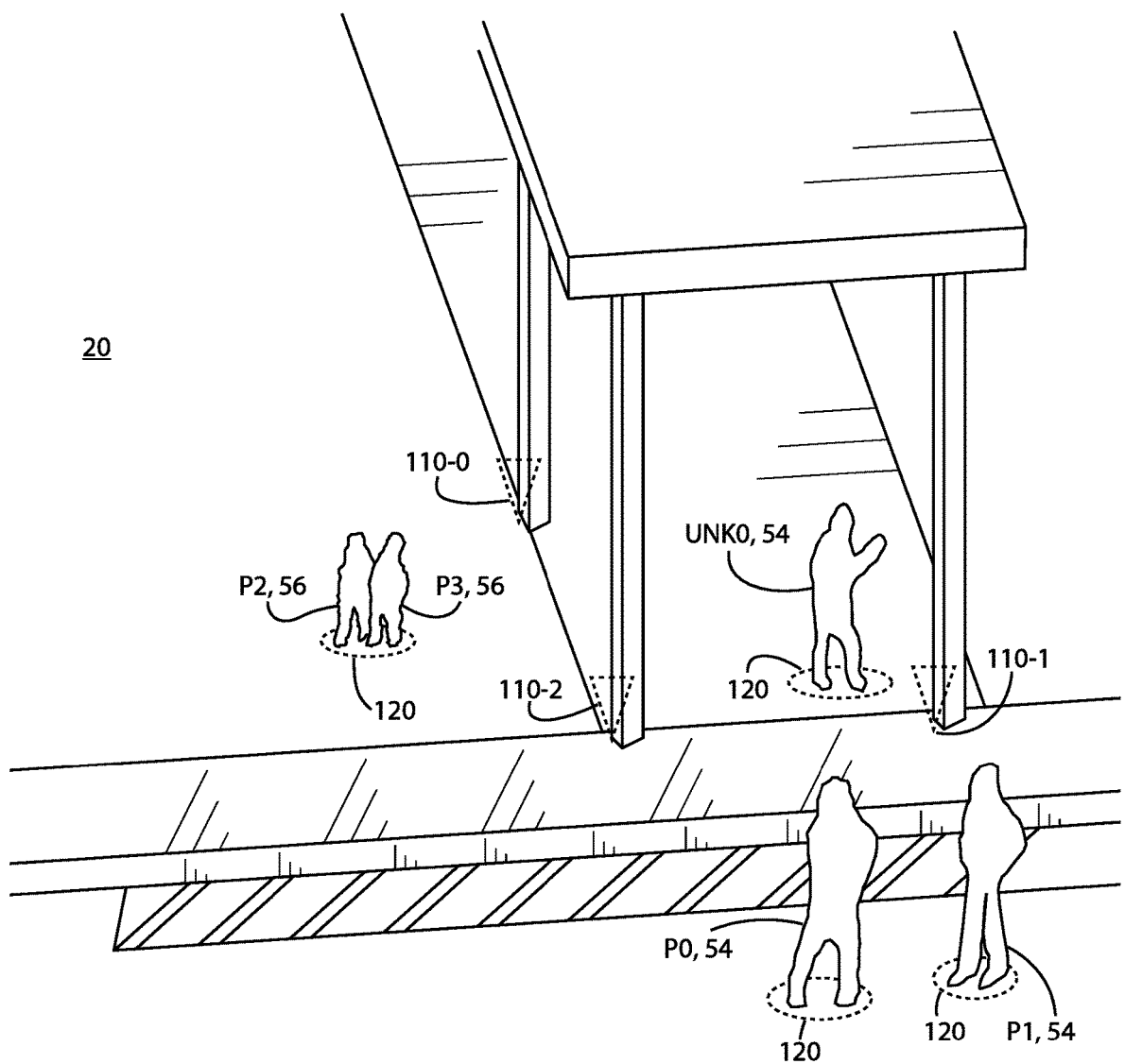
FIG. 2 shows an edge based output for a field of view captured by a light sensor in accordance with one embodiment.

An example edge output of the edge detection module based on an image detected by the detector 412 is shown in FIG. 2. For purposes of disclosure, the image is shown with lines (with the exception of surface lines) that correspond to edges corresponding to objects of interest in the image output from the detector 412. In the illustrated embodiment, there are three landmarks 110-0, 110-1, 110-2 in the field of view 414. There may be more or fewer landmarks 110 in one or more of the embodiments described herein.

Each of the landmarks 110-0, 110-1, 110-2 in the illustrated embodiment may be identified in the edge output based on one or more criteria determined from the identifying information stored in the landmark database 112.

The one or more landmarks 110 within the field of view 414 may be selected based on features that make the landmark 110 discernable by the LRLS 400 under a variety of conditions. For instance, features or objects in the field of view 414 may be selected as a landmark 110 based on the feature or object extending upward relative the ground and being static. This way, in snowy conditions in which the ground becomes covered, the landmark 110 may still be identified in the image and provide a reference point for determining locations of objects in the images. It is noted that it is not necessary for all or any of the features or objects selected as landmarks 110 to have height due to extension upward from the ground. For instance, painted lines on a walkway or parking area, such as those shown in FIG. 2, may be identified as landmarks 110.

In one embodiment, the object in the field of view 414 may include more than one feature that forms a landmark 110, such that the object may include a plurality of landmarks 110. For instance, a post supporting a roof structure may include a base feature and an elevated feature (e.g., a reflector) that both form landmarks 110 and facilitate providing two points of reference for the image obtained by the detector 412.

In the illustrated embodiment, the field of view 414 corresponds to the region designated II in the illustrated embodiment of FIG. 1 and detected by the light sensor 410-0. The field of view 414 in the illustrated embodiment includes a plurality of landmarks 110-0, 110-1, 110-2 and multiple persons, designated P0, P1, P2, P3, and UNK0. These designations are selected for purposes of discussion, and with prefixes corresponding generally as follows: P—Authorized Person, UNK→Unknown or Unauthorized Person. The locations and number of P persons and UNK persons may vary depending on the circumstances.

The device 420 or the LRLS 400, or a combination thereof, may include a light-based location module or locator stored in memory and configured to determine a) the reference frame for the image obtained from the light sensor 410, and b) locations for one or more persons identified in the image. The device 420 is not limited to use of images; a point field map or other representation of sensor information obtained from the light sensor 410 may be generated for analysis to determine locations of objects in the field of view 414.

Identification of the landmarks 110 or the persons, or both, in the image may be based on output from an object identification module (e.g., a person recognition module). The object identification module may include heuristic analysis or a machine learned algorithm, or both, of the edge detection outputs for which landmarks or persons, or both, have been manually identified. In one embodiment, the machine learned algorithm may be trained with training data or truth data that is manually identified by a person. The color profile of the image, and edge based output (including shape information), or a combination thereof, may be provided by the machine learned algorithm for identification of a group of pixels corresponding to a person or a landmark 110. The shape of a person is generally considered unique within the realm of the area 20—although the shape of a person is not necessarily unique. The shape or structure of the landmark 110 may be obtained from the landmark database 112.

The machined learned algorithm may be trained to identify objects shaped like a person as a person or objects conforming to the landmark information from the landmark database 112 as a landmark associated with the landmark information. In one embodiment, the color profile or pixels of the image may be processed directly by the machine learned algorithm to identify groups of pixels corresponding to a person or a landmark 110. In this way, the machine learned algorithm may receive the image with little or no preprocessing (such as the preprocessing performed by the edge detection module).

Features determined for input to the machine learning algorithm may be customized for the application, or may be developed by unsupervised analysis of a significant number of images. The machined learned algorithm or other types of object or person detection algorithms, in one embodiment, may be configured to receive light-based inputs other than images, such as a point field map obtained from a LiDAR sensor, and detect locations of objects and/or persons represented in the light-based input. Additionally or alternatively, the object detection algorithm may be configured to receive RF-based input (e.g., from a microwave RADAR system) to detect locations of objects and/or persons represented in the light-based input.

In one embodiment, the machine learning algorithm may be based on a feedforward neural network that receives a set of pixels (e.g., a vector of values for each pixel corresponding to the RGB values and the white level or intensity level) and determines a bounding box or coordinates of an outline corresponding to one or more persons captured in the set of pixels or one or more landmarks 110 captured in the set of pixels, or a combination thereof.

The lower area of the bounding box, the outline, or the set of pixels, or a combination thereof, may be analyzed to determine locations of one or more feet of a person or the lower portion of a landmark 110. In the context of a person, based on the pixel locations of the feet and the reference frame of the image (e.g., surface angle relative to the image detection plane and scale), the pixel locations of the feet may be translated to a location in the area 20 corresponding to the location of the feet. In cases where a person is identified but no feet are detected, the lowermost pixels of the bounding box or the outline may be used to estimate the location of the person based on a translation of the lowermost pixels to the area 20. The location information determined with respect to the person may be stored in memory, or used over time (e.g., motion capture of multiple images in the field of view 414) to determine a motion vector of the person. The person may be standing still or in motion, and a velocity vector determined with respect to the person may facilitate correlation of the person in multiple fields of view 414 from different light sensors 410, thereby enhancing accuracy of the location determination with respect to the person.

In the illustrated embodiment of FIG. 2, the pixel area corresponding to the feet of the persons P0, P1, P2, P3 and UNK0 are identified in phantom lines, designated 120.

In one embodiment, the height or overall size, or both, may be determined based on the reference frame of the image, determined from the one or more landmarks 110 identified in the image, and the pixel difference between pixels of the person. For instance, the height of the person may be determined based on the number of pixels between the lowermost pixels and the uppermost pixels identified by the bounding box or outline of the person.

As described herein, if the height of the person is determined to be below a threshold, the person may be considered authorized for access to the area. To provide an example, if the person is below a threshold considered to be indicative of a child-sized person (e.g., below 4 feet), the person may be considered authorized for access to the area 20.

In one embodiment, all or a portion of the landmark 110 may be identified in the image by the device 420 or the LRLS 400, or a combination thereof, in the image. Based on the known locations of the landmark 110 obtained from the landmark database 112, a reference frame may be formed for the image that allows translation of pixels to actual locations in the area 20. As an example, the landmark 110 may be in the shape of a symbol (e.g., a triangle, square, circle, or ellipse, or any combination thereof in any combination of orientations in any combination of colors [e.g., ▲■◀□ ]) disposed on a post or in an elevated position. An elevated position may avoid the effects of potential ground cover such as snow obstructing the landmark 110. In one version of this example, different symbols may be utilized for different landmarks 110 in a field of view to facilitate distinguishing between the symbols and identification thereof.

In this example, the machine learned algorithm or another processor may be configured to identify the landmark 110 and associate a bounding box or the outline with the landmark 110 in the image, thereby associating a group of pixels in the image with the landmark 110. With identification of two landmarks 110 in an image, and the locations of these landmarks 110 being known (or determined dynamically), a scale of the image relative to the area 20 can be determined. With identification of at least three landmarks 110 in an image, and the locations of these landmarks 110 being known (or determined dynamically), a plane corresponding to the area 20 can be determined relative to the image of the detector 412. This plane and the scale of the plane relative to the area 20 may form the basis for translation pixels of the image to locations in the area 20. In one embodiment, a known or determined elevation of a landmark 110 relative to the ground may be used in determining the plane corresponding generally to the ground of the area 20.

Additionally, or alternatively, the terrain or topography of the area 20 may be known so that the translation from the pixels to a location may account for variations in elevation of the area 20. For instance, with respect to the plane, a normal mapping relating to the topography of the area 20 may be used as a basis for translating the pixels of the image to actual locations in the area 20.

In one embodiment, a subset of the pixels of the image may be translated to locations in the area 20. For instance, in the case of a person standing in the field of view 414, the pixels that show the feet of the person may be translatable to a location in the area 20 because the feet are likely to be disposed in close proximity to the ground. However, pixels corresponding to the head of the person may not translate in the same way to a location of the area because the person's head is unlikely to be disposed in proximity to the ground, possibly two meters or several feet away from the ground. As an example, to determine the location of the person's head, the height of the person may be determined based on the pixel scale determined from the reference frame (which may be determined from the one or more landmarks) and the detection angle. With this height information and the reference frame, the location of the person's head may be determined.

In the illustrated embodiment, if there is a clear view of the person's feet, the subset of pixels corresponding to a person's feet may be used as a basis for identifying the location of the person. On the other hand, if the person's feet are obstructed, other aspects of the person (e.g., a head or arm) may be identified and translated to a location within the area 20.

It is noted that the field of view 414 may include other areas much larger than the focus area. These other areas may be considered low priority with little to no interest with respect to the detector 412, or may be monitored by another detector 412.

In one embodiment, locations of persons may be determined based on different fields of view 414 from different detectors 412 spaced at different locations. For instance, accuracy or confidence, or both, with respect to a person's location may be enhanced by providing multiple fields of view of the person. The person detection algorithm, such as the machine learning algorithm, may be configured to identify a person and their location based on multiple images obtained with respect to different fields of view, potentially correlated by the one or more landmarks 110 in the image, which may be predetermined or selected dynamically to facilitate correlating of the light-based input (e.g., images) from multiple detectors 412.

In the illustrated embodiment, the positions of the persons P0, P1, P2, P3, UNK0 may be determined within the area 20 and communicated as data B, or location information for a person or persons. For purposes of disclosure, the persons P0, P1, P2, P3, UNK0 are not all authorized for access to the area 20. In one embodiment, the LRLS 400 is configured to identify locations of persons regardless of whether they are authorized for access. In one embodiment, based on the one or more persons identified and located by the LRLS 400 and correlation or lack of correlation with locations of one or more RFID devices 330 (carried by the one or more persons), the intruder detection system 100 may determine whether a person is authorized for access to the area 20.

Figure 8:
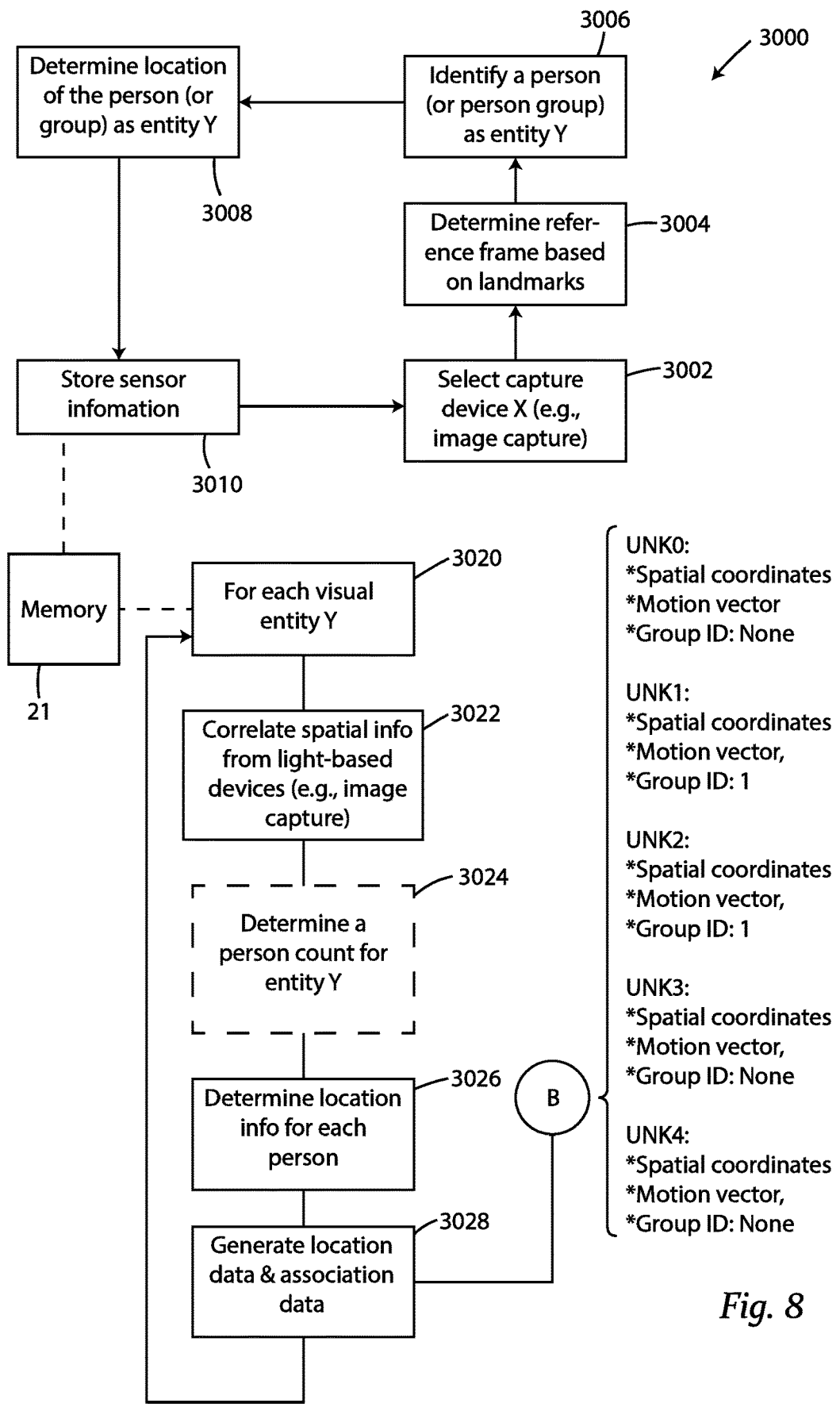
FIG. 8 shows a method of operation in accordance with one embodiment.

A method of determining a location of one or more objects in the area 20 in accordance with one embodiment is depicted in FIG. 8 and generally designated 3000. The method 3000 may include obtaining light-based feedback with a light sensor 410 based on light reflected from one or more objects in the field of view 414 of the light sensor 410. In the illustrated embodiment, the light-based feedback is an image—although the present disclosure is not so limited. Step 3002. Further, it should be understood that the light-based feedback described in conjunction with the illustrated embodiment may be replaced with other types of feedback, such as RF feedback from a microwave RADAR system or other types of reflected feedback from an object or person.

The LRLS 400 may determine a reference frame for the image obtained from the light sensor 410. The reference frame may be determined based on identification of one or more landmarks 110 in the image and predetermined (or dynamically determined) location information with respect to the one or more landmarks 110. In one embodiment, at least three landmarks 110 may be provided in the field of view 414, providing three reference points that together define a plane having a scale that facilitates translation of pixels in the image to locations in the area 20. Additional landmarks 110 may be provided to define more than one plane in the image to facilitate translations. As an example, with more landmarks 110 in the image, polygon planes may be defined with respect to the area 20 so that a topography of the image relative to the area 20 can be determined for translation of pixels to locations in the area 20. Step 3004.

The LRLS 400 may process the image to identify objects of interest, including persons or groups of persons. As discussed herein, this identification may be conducted in a variety of ways, including with a trained neural network. Step 3006. The LRLS 400 may determine location information with respect to the identified object of interest. More specifically, in the illustrated embodiment, the LRLS 400 may determine location information based on the image and the reference frame for one or more persons or one or more groups of persons identified in the image. Step 3008. The pixels associated with the one or more persons or one or more groups of persons, or a combination thereof, may be translated in accordance with the reference frame of the image to a location in the area 20. In one embodiment, the LRLS 400 may synchronize operation of the light sensors 410 so that light sensed by each light sensor 410 may be correlated in time. For instance, if an artificial light source paints a region with light having a distinguishable characteristic (e.g., distinguishable from ambient light), the time at which the distinguishable light is emitted may be synchronized with receipt of this distinguishable light in a plurality of light sensors 410.

The location information determined with respect to the image from a light sensor 410 may be stored in memory 21.

In the illustrated embodiment, the method 3000 may include obtaining the location information stored in memory 21 for each entity or object identified by the output from the plurality of light sensors 410 (and associated detectors 412). In one embodiment, the location information stored in memory 21 may be based solely on a location determination based on an image or motion capture obtained from a light sensor 410. The method 3000 may involve correlating such a location determination with one or more other location determinations obtained with respect to one or more other light sensors 410. Steps 3020, 3022. Alternatively, the location information stored in memory 21 may be based on sensor output for an entity or object from a plurality of light sensors 410.

Optionally, after location information for an entity is determined, a person count may be determined for the entity. An object being tracked by the LRLS 400 may be a group of persons rather than a single person. The number of persons in the group may be estimated based on one or more criteria, as discussed herein, including size of the entity (e.g., as determined from multiple angles or multiple light sensors 410) or edge detection with respect to persons identified in the group, or a combination thereof. Step 3024.

Spatial data for each identified person, whether present by themselves or present within a group, may be determined based on the location information determined for one or more entities identified in the feedback from the plurality of light sensors 410. The spatial data may include any type of information relevant to a location or motion, or both, of the person. For instance, for each person, the spatial data may include spatial coordinates, a group identifier (if the person is identified in a group), or a motion vector (e.g., velocity vector), or a combination thereof. This spatial data may be output as data B, forming location information provided by the LRLS 400 to the identification system 200. Steps 3026, 3028.

IV. Intrusion Detection System

Returning to the illustrated embodiment of FIG. 3, the intruder detection system 100 may include an identification system 200 configured to determine whether one or more persons identified by the RFRLS 300 or the LRLS 400, or both, are authorized for access to the area 20. The identification system 200 may be configured similar in some respects to the real-time location device 320, including a processor 120, memory 121, and input/output interface 122. The identification system 200 may be communicatively coupled to the RFRLS 300 and the LRLS 400 to receive data A and data B. The present disclosure is not limited to communicating only data A and data B to the identification system 200—more, less or different types of data may be communicated to or from, or both, among the identification system 200, RFRLS 300, and the LRLS 400.

In the illustrated embodiment, the identification system 200 may be operably coupled to an alert system 204, as discussed herein. The identification system 200 may communicate intruder information pertaining to a potential intruder detected in the area 20 for processing by the alert system 204. The alert system 204 may be directed to generate a notification by the identification system 200, or the alert system 204 may determine whether to generate a notification based on the intruder information, or both. The notification generated from the alert system 204 may vary depending on the application. As an example, the notification may be an SMS text message or message to a local authority (e.g., the police) regarding a potential intruder in the area 20. As another example, the notification may be in the form of an image, possibly with a bounding box or outline of the intruder, sent to school or building personnel for further consideration. Optionally, in this form of notification, the school or building personnel may respond to the notification (e.g., by return email or a vote or an SMS return response) confirming presence of an intruder, and the alert system 204 may automatically direct another notification to a local authority or a person or persons designated for authority over the area 20.

The identification system 200, in one embodiment, may be coupled to a display 202. The display may depict one or more of the fields of view 414, as well as provide an indicator, such as an overlay, to identify one or more persons in the field of view as being an authorized person or an intruder. The display 202 may be configured to generate a visual alert to a user (e.g., security personnel watching the display) in response to determining a person is an intruder.

In one embodiment, the visual alert on the display 202 or the alert system 204, or both, may vary in intensity or importance of an alert based on proximity of an identified intruder to a building 30 or a subzone of the area 20 identified as being of higher value (e.g., a playground during recess). The value of a subzone may vary based on the time of day and/or usage.

An example of varying intensity or importance of an alert includes generating a low intensity alert for an intruder that has just entered the area 20 and is located near the outer boundary of the area 20. As the intruder continues on into the area 20 and moves closer to a higher value subzone (e.g., closer to a building 30), the intensity of the alert may increase. For instance, the alert may change from a simple bound box identifier for the intruder on the display 202 to both a flashing identifier on the display 202 and an audible alert.

As discussed herein, the identification system 200 may include an intruder determination module or algorithm stored in memory and configured to determine whether a person is an intruder based on location information obtained from the LRLS 400 and the RFRLS 300. In one embodiment, the LRLS 400 may identify a person in the field of view 414 of one or more light sensors 410 and provide location information with respect to that person. The location information from the LRLS 400 may include spatial coordinates and optionally a motion vector of the person. The RFRLS 300 may provide location information with respect to an RFID device 330 carried by the person. The location information from the RFRLS 300 may include spatial coordinates and optionally a motion vector of the RFID device 330. If there is correlation between the spatial coordinates (and optionally the motion vectors), and an identifier of the RFID device 330 is indicative of authorization for access to the area 20, the identification system 200 may determine the person located by the LRLS 400 is authorized for access to the area 20. Correlation may be based on a comparison of the location information or a probabilistic analysis of the probability of the person located by the LRLS 400 carrying the RFID device 330 located by the RFRLS 300. In one embodiment, because the person is moving, the correlation analysis may be dynamic so that multiple measurements of location may be utilized to enhance accuracy of the determination of whether the person is authorized for access or is an unauthorized intruder.

The identification system 200 determines that the LRLS 400 has provided location information for a person but if there is no similarly located RFID device 330, identified by the RFRLS 300, the identification system 200 may determine that person is an intruder. In this way, absence of an RFID device 330 being located at the same or substantially similar location as the person located by the LRLS 400 may be indicative of the person being an intruder. People with access to the area 20 may carry an RFID device 330 and traverse the area 20 without the need to pass through a checkpoint or a single point of entry to the area 20. Although an intruder may also pass into the area 20, because the intruder is not carrying an RFID device 330 with an identifier indicative of access to the area 20, the intruder can be identified and an alert can be generated so that the intruder can be approached by personnel before attempting to gain access to the building 30. It is noted that correlation and identification of an intruder may be based in part on the probability of an intruder being in fact an intruder. In the illustrated embodiment of FIGS. 2-5, the person designated UNK0 is an intruder—the LRLS 400 identifies the person UNK0 in the FIG. 5 embodiment but no such RFID device 330 is located by the RFRLS 300 in the FIG. 4 embodiment.

In one embodiment, an intruder may attempt to avoid detection by traveling with one or more other persons who are authorized for access to the area 20 and carrying an RFID device 330. The LRLS 400, as discussed herein, may determine location information for groups of persons and identify a number N of persons associated with the group. The determination of the number of persons may be based on the overall size of the group or detection of edges corresponding to individual persons, or a combination thereof. The identification system 200 may analyze the location information received from the RFRLS 300 to determine if N number of RFID devices 330 are located in proximity to the group. If there are less than N number of RFID devices 330, the group or a subset thereof may be identified as an intruder.

Figure 6:
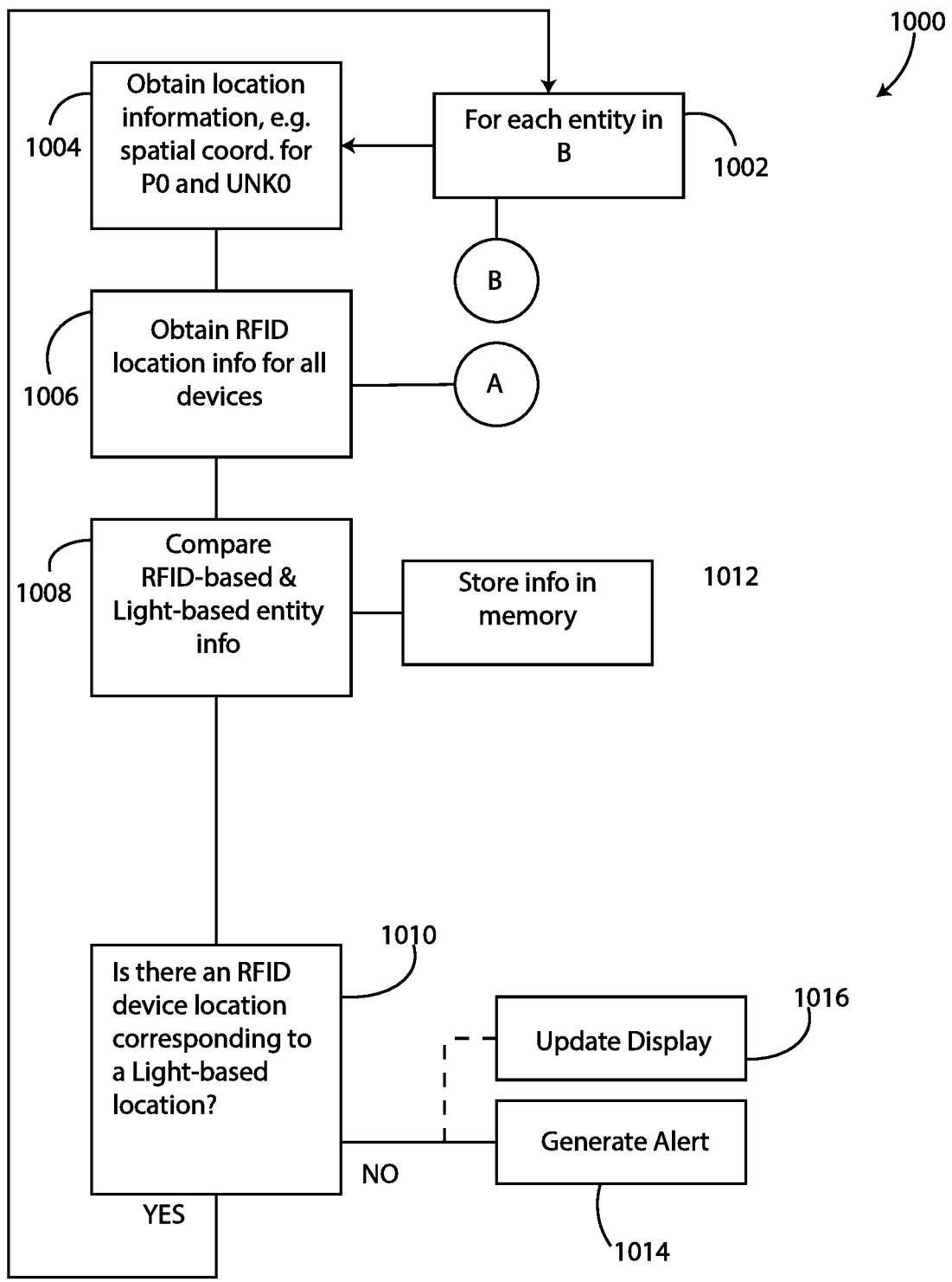
FIG. 6 shows a method of operation in accordance with one embodiment.

A method according to one embodiment of identifying one or more authorized persons or one or more intruders, or a combination thereof, with respect to the area 20 is depicted in FIG. 6, and generally designated 1000. The method 1000 may include considering the location information for each entity or person identified in data B generated by the LRLS 400, such as a person P0 and a person UNK0. The method may include obtaining the RFID location information (e.g., data A) from the RFRLS 300 and comparing the RFID location information with the location information for the person (e.g., P0, UNK0) being considered. Steps 1004, 1006. If a location of an RFID device 330 substantially corresponds to a location for the person as determined by the LRLS 400, the person may be considered authorized for access to the area 20. Steps 1008, 1010. On the other hand, if there is no RFID device 330 located by the RFRLS 300 that corresponds to the location of the person as determined by the LRLS 400, the person may be considered an intruder to the area 20. Based on a determination that the person is an intruder, an alert may be generated and optionally a display may be updated. Steps 1014, 1016.

In one embodiment, location information for a person (e.g., P0 or UNK0) or an RFID device 330, or a combination thereof, may be stored from iteration to iteration so that a location history can be used to facilitate determining correspondence between a person identified by the LRLS 400 and an RFID device 330 or absence of an RFID device 330 as identified by the RFRLS 300.

In one embodiment, as described herein, the LRLS 400 may operate absent landmarks 110 to identify persons and/or objects in the field of view 414. As an example, the field of view 414 may be directed to a specific area in which the number of persons can be determined (e.g., edge detection). The locations of the persons can be determined to coincide with the field of view 414, and this location information may facilitate identifying a person whose location does not coincide with an RFID device 330. For instance, the field of view 414 may be the entry way to the building 30 such that five or less people are generally visible at any point in time. If the LRLS 400 identifies a person for which the RFRLS 300 does not identify a correspondingly located RFID device 330, the system 300 may identify that person as a potential intruder.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes may be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. An intrusion detection system for detecting an unauthorized person within an area, said intrusion detection system comprising:
    a light sensor configured to sense light reflected from one or more objects in the area, the light sensor configured to generate light sensor output indicative of the light reflected from the one or more objects;
    a person detector configured to identify a person based on the light sensor output, wherein the one or more objects in the area include the person;
    a light-based locator operably coupled to the person detector, the light-based locator configured to determine person location data pertaining to a location of the person identified by the person detector;
    a wireless communication system configured to communicate wirelessly with one or more remote devices in the area, the wireless communication system configured to determine remote device location data pertaining to a location of the one or more remote devices within the area; and
    an intruder detector configured to determine a) the person is an intruder based on the person location data and absence of a remote device being located at or near the location of the person or b) the person is authorized for access to the area based on the location of the person and presence of a remote device located at or near the location of the person.

2. The intrusion detection system of claim 1 comprising one or more landmarks provided in the area, wherein a position of the one or more landmarks is known, wherein the one or more objects in the area include the one or more landmarks, and wherein the light-based locator is configured to determine the person location data based on known positions of the one or more landmarks provided in the area.

3. The intrusion detection system of claim 2 wherein the one or more landmarks include at least a portion that is vertically displaced from ground level.

4. The intrusion detection system of claim 3 wherein a height of the at least the portion of the one or more landmarks is known.

5. The intrusion detection system of claim 2 wherein each of the one or more landmarks are provided with a remote landmark communication device configured to communicate with the wireless communication system, and wherein the wireless communication system is configured to determine the remote device location data based on communications with the remote landmark communication device and communications with the remote device.

6. The intrusion detection system of claim 1 wherein the person detector is configured to distinguish between a child-sized person and an adult-sized person.

7. The intrusion detection system of claim 6 wherein a child-sized person is ignored as a potential intruder to the area.

8. The intrusion detection system of claim 6 wherein the person detector is configured to identify a group of persons associated with N persons, and wherein the wireless communication system is configured to determine a location of N number of remote devices associated with the group.

9. The intrusion detection system of claim 8 wherein the wireless communication system is configured to determine a location of N or less number of remote devices associated with the group, and wherein the intrusion detection system is configured to determine at least one person of the group is an intruder based on absence of one or more remote devices associated with the group.

10. A method of detecting an unauthorized person within an area, said method comprising:
sensing light reflected from one or more landmarks and an authorized person;
providing light sensor output based on the light reflected from the authorized person;
generating person location data, based on the light sensor output, pertaining to a location of the authorized person within the area;
wirelessly communicating with a remote device associated with the authorized person;
generating remote device location data based on wireless communications with the remote device; and
determining the authorized person is not an intruder based on the person location data and the remote device location data being indicative that the remote device is located at or near the location of the authorized person.

11. The method of claim 10 comprising:
providing the unauthorized person in the area;
generating person location data, based on the light sensor output, pertaining to a location of the unauthorized person within the area; and
determining the unauthorized person is an intruder based on the location of the unauthorized person and absence of a remote device being located at or near the location of the unauthorized person.

12. The method of claim 10 wherein the authorized person is a first authorized person and comprising providing a second authorized person in the area.

13. The method of claim 12 wherein the second authorized person is a child-sized person, and the first authorized person is an adult-sized person, and comprising determining the second authorized person is authorized for access to the area based on the second authorized person being child-sized.

14. The method of claim 10 comprising:
providing an unauthorized person, wherein the authorized person and the unauthorized person are in close proximity to each other to form a person group;
determining group location data, based on the light sensor output, pertaining to a location of the person group within the area;
identifying a number of persons within the person group based on the light sensor output;
associating the group location data with each of the persons of the person group as the person location data for each of the persons of the person group; and
determining the unauthorized person is an intruder based on a) the person location data for the unauthorized person and b) absence of a number of remote devices located at or near the group location data that is equal to the number of the persons of the person group.

15. The method of claim 10 wherein said providing light sensor output includes providing light sensor output based on the light reflected from one or more landmarks and the authorized person, and wherein said generating person location data includes generating person location data based on the light sensor output pertaining to light reflected from the one or more landmarks.

16. The method of claim 15 comprising providing a remote landmark communication device configured to communicate wirelessly, and wherein said generating remote device location data is based on wireless communications with the remote landmark communication device and wireless communications with the remote device.

17. The method of claim 16 comprising determining a 3-dimensional reference frame for the light sensor output based on the light reflected from 3 or more landmarks.

18. A system for detecting an intruder in an area, said system comprising:
a detector configured to electromagnetic radiation reflected from one or more objects in the area;
a person detector configured to determine, based on detector output from the detector, person location data with respect to a person within the area, wherein the one or more objects in the area include the person;
a communication system configured to communicate wirelessly with one or more remote devices in the area, the communication system configured to determine remote device location data pertaining to a location of the one or more remote devices within the area; and
an intruder detector configured to determine the person is an intruder based on the person location data and absence of a remote device being located at or near the location of the person.

19. The system of claim 18 wherein the intruder detector is configured to determine the person is authorized for access to the area based on the location of the person and presence of a remote device located at or near the location of the person.

20. The system of claim 18 comprising one or more landmarks provided in the area, said one or more landmarks being identifiable by the person detector and operable to facilitate determining the person location data within the area.

* * * * *